(12) United States Patent
Gisler et al.

(10) Patent No.: US 7,866,360 B2
(45) Date of Patent: Jan. 11, 2011

(54) HOT AIR NOZZLE

(75) Inventors: Lukas Gisler, Alpnach Dorf (CH);
Mauriz Lustenberger, Kriens (CH);
Adolf Niederberger, Kägiswil (CH)

(73) Assignee: LEISTER Process Technologies,
Këgiswil (CH)

( * ) Notice: Subject to any disclaimer, the term of this patent is extended or adjusted under 35 U.S.C. 154(b) by 791 days.

(21) Appl. No.: 11/853,059

(22) Filed: Sep. 11, 2007

(65) Prior Publication Data
US 2008/0066871 A1    Mar. 20, 2008

(30) Foreign Application Priority Data
Sep. 15, 2006    (DE) .................. 20 2006 014 390 U

(51) Int. Cl.
*B29C 65/02* (2006.01)
(52) U.S. Cl. .................. 156/499; 156/544; 156/574; 239/592; 126/271.1; 126/271.2 A
(58) Field of Classification Search .............. 156/497, 156/499, 544, 574, 577, 579; 126/271.1, 126/271.2 A; 239/592
See application file for complete search history.

(56) References Cited

U.S. PATENT DOCUMENTS

| 4,440,588 | A | * | 4/1984 | Stevenson et al. ........... 156/157 |
| 4,855,004 | A | * | 8/1989 | Chitjian ..................... 156/359 |
| 4,981,548 | A | * | 1/1991 | Poll ........................... 156/584 |
| 5,552,014 | A | * | 9/1996 | Morris ........................ 156/577 |
| 6,149,762 | A | * | 11/2000 | Kobzan ....................... 156/497 |
| 6,187,122 | B1 | * | 2/2001 | Hubbard et al. ............... 156/82 |
| 6,533,014 | B1 | * | 3/2003 | Rubenacker et al. ......... 156/497 |
| 6,610,159 | B2 | * | 8/2003 | Henegar ....................... 156/82 |
| 7,631,678 | B2 | * | 12/2009 | Cartier et al. ............... 156/497 |
| 2003/0019586 | A1 | | 1/2003 | Henegar |
| 2008/0142164 | A1 | * | 6/2008 | Martinez ..................... 156/497 |

FOREIGN PATENT DOCUMENTS

CH    694 088 A5    7/2004
DE    16 52 399 A1    1/1971

OTHER PUBLICATIONS

European Search Report for corresponding Application No. EP 07 01 3651 dated Nov. 14, 2007.

* cited by examiner

*Primary Examiner*—Mark A Osele
(74) *Attorney, Agent, or Firm*—Renner, Otto, Boisselle & Sklar, LLP

(57) ABSTRACT

A hot air welding nozzle for a hot air welding device for welding overlapping webs of sealing material. The hot air welding nozzle includes a connection for a hot air supply, a top and a bottom heat plate forming an air space, and at least one rear outlet between the top and bottom heat plate on a facing side that is oriented in a direction opposite to the moving direction of the hot air welding device, with at least one front outlet relative to the moving direction of the hot air welding device, and with air guides that extend beyond the facing sides of the heat plates, at least on the inner side.

11 Claims, 3 Drawing Sheets

HOT AIR NOZZLE

CROSS-REFERENCE TO RELATED APPLICATION

This application claims priority under 35 USC §119 to German Application No. 20 2006 014 390.4, filed on Sep. 15, 2006, the entire disclosure of which is incorporated herein by reference.

TECHNICAL FIELD OF THE INVENTION

The present invention relates to a hot air welding nozzle for an hot air welding device for welding overlapping webs of sealing material, in particular webs of bitumen, with a connection for a hot air supply, a top and a bottom heat plate forming an air space, and at least one rear outlet between the top and bottom heat plate on a facing side that is oriented in a direction opposite to the moving direction of the hot air welding device.

DESCRIPTION OF THE RELATED ART

Hot air welding nozzles are known for hot air welding devices that have, on a self-propelled chassis, a hot air device that can be rotated around a horizontal axis so that the hot air welding nozzle located at one end of the hot air device can be placed laterally between the overlapping webs of sealing material for the welding process. When the hot air welding device moves along the edges of the webs of sealing material, the hot air exiting from the top and the bottom surface of the nozzle heats the top surface of the bottom web of sealing material and the bottom surface of the top web of sealing material. In addition, they are heated to a considerable degree by the hot air exiting from the rear outlet of the nozzle immediately before a pressure roll of the hot air welding device presses the webs of sealing material against each other. In order to ensure proper guidance of the webs of sealing material over the hot air welding nozzle, a hot air welding nozzle known from the prior art has a wedge-shaped cross section where the narrower end is on the side facing away from the connection for the hot air supply. In addition, the outlets on the top and bottom surface of the heat plate are located at the end opposite the rear outlet in order to ensure the pre-heating of the web of sealing material. However, it was found in the field that the welding process can not be performed with satisfactory speed when a hot air welding nozzle of this design is employed.

SUMMARY OF THE INVENTION

The present invention addresses a problem of proposing a solution that would permit the faster welding of webs of sealing material, in particular webs of sealing material made of bitumen.

Such problem may be solved by a hot air welding nozzle in accordance with the present invention, and a hot air welding device with such a hot air welding nozzle.

According to the invention, the hot air welding nozzle has at least one front outlet relative to the moving direction of the hot air welding device. That has the effect that the entire effective heating zone where the webs of sealing material are pre-heated and then plasticized for the welding process is significantly enlarged. In already pre-heated condition, the webs of sealing material reach the heat plates where the outlets are preferably distributed evenly over the entire surface; after passing the heat plate, they reach the rear outlet where they are sufficiently plasticized for the subsequent welding process. The front as well as the rear outlet may be designed as slots with one opening, or, with interruptions, as several openings or holes that extend in familiar fashion across the entire width of the nozzle. In order to prevent the hot air exiting from the front and rear outlets from passing beyond the edge of the bottom film between the webs of sealing material, thereby destroying the insulating layer underneath, air guides extending beyond the faces of the heat plate are mounted on the hot air welding nozzle, at least on the inner side, the one facing away from the connection for the hot air supply. These air guides prevent the hot air from reaching undesirable areas and ensure that the hot air remains precisely in the zone that is important for the welding process.

According to a further embodiment of the invention, the top and the bottom heat plate are essentially parallel. As a consequence, the rear outlet as well as the front outlet have a uniform air outlet area, preferably across the entire width of the hot air welding nozzle, thereby achieving a more uniform air distribution than the familiar triangular outlet openings. In addition, the heat plates may have outlets that are preferably distributed evenly, thereby generating a hot air cushion between the top heat plate and the top web of sealing material. In this way, the top web of sealing material contacts, in part, the top heat plate, while, on the other hand, the hot air exiting from the outlets becomes effective. Beside the hot surface of the heat plate, the exiting hot air also has a heating effect on the web of sealing material.

It offers advantages if the air guides are designed as lateral metal guide strips that taper towards the free end. Besides controlling the air flow, this design also has the effect that the webs of sealing material, in particular the thick webs of sealing material made of bitumen, are gradually lifted without bending to the maximum thickness of the nozzle in the heat plate area. This ensures the proper proximity of the bottom surface of the top web of sealing material to the top surface of the top heat plate.

According to another embodiment of the invention, an air brake that can be rotated into the hot air flow exiting from the nozzle of the hot air welding device when the nozzle is in rest position is installed in the area of the front outlet. In rest position, the hot air device mounted on the hot air welding device is usually rotated around a horizontal axis in order to position the hot air welding nozzle as far away from the web of sealing material as possible so that the web of sealing material is not heated inadvertently. In order to prevent the hot air now exiting from the front outlet from heating, above all, the web of sealing material, or other parts of the hot air welding device, this rotating air brake is provided. Preferably, it is designed so that the hot air exiting from the front outlet is essentially deflected back towards the heat plates. As a matter of expediency, this is accomplished by a chute-type air deflection device made of two longitudinal walls.

In order to ensure that this air brake works reliably and slows down or deflects the exiting hot air flow in rest position when the hot air welding device is still running, the air brake is supported with a stop, rotating via a lever, so that the air deflection device is put into the desired position by gravity. Preferably, the air brake has a wheel that, when the nozzle is placed on a web of sealing material, rotates the air deflection device out of the flow of hot air, runs along on the web of sealing material, and keeps the air deflection device out of the hot air flow.

With the hot air welding nozzle designed as proposed by the invention, and/or the hot air welding device of corresponding design, it is possible to weld webs of sealing material, in particular webs of sealing material made of bitumen, much faster than before, due to the long pre-heating zone.

Additional characteristics and advantages of the invention can be found in the following description of an embodiment in conjunction with the Claims and the drawings. The individual characteristics may be implemented in embodiments of the invention either individually or in combination with others.

DETAILED DESCRIPTION OF THE INVENTION

Figure 1:
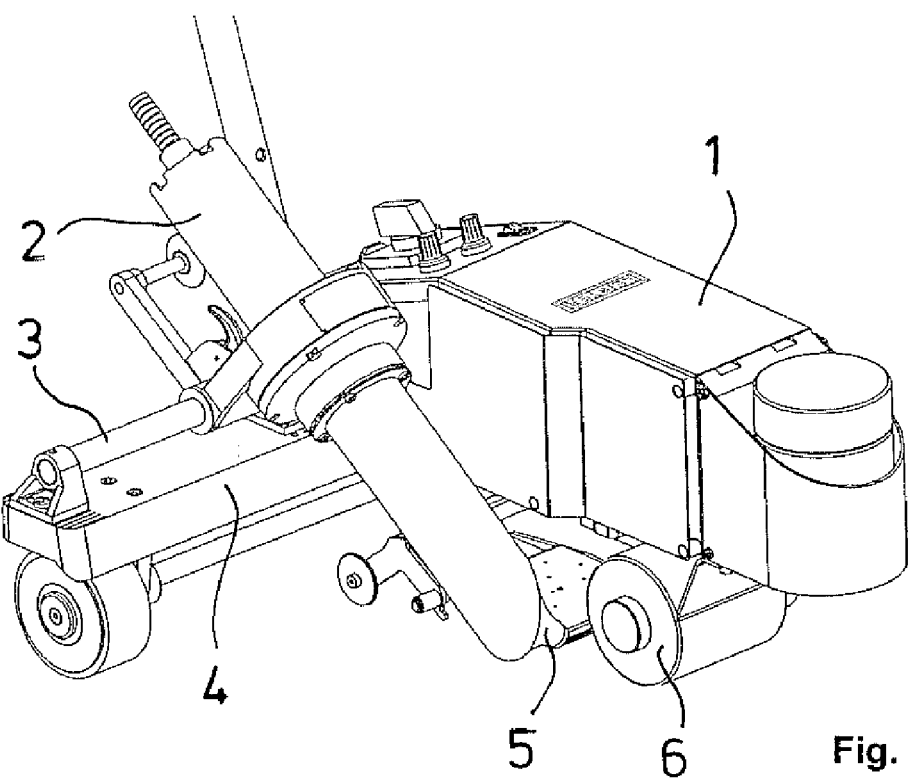
FIG. 1 shows an automatic hot air welding device with a hot air device in operating position.

FIG. 1 shows an automatic hot air welding device 1 that, on its chassis 4, has a hot air device 2 that can be rotated around a horizontal axis 3. In this Figure, the hot air device is shown in operating position so that the hot air welding nozzle 5 mounted at the end is located in familiar fashion between the two webs of sealing material (not shown), essentially aligned with the pressure roll 6. With its bottom surface, the hot air welding nozzle 5 rests in familiar fashion on the top surface of the bottom web of sealing material (not shown) while the top web of sealing material passes over the top surface of the hot air welding nozzle 5.

Figure 2:
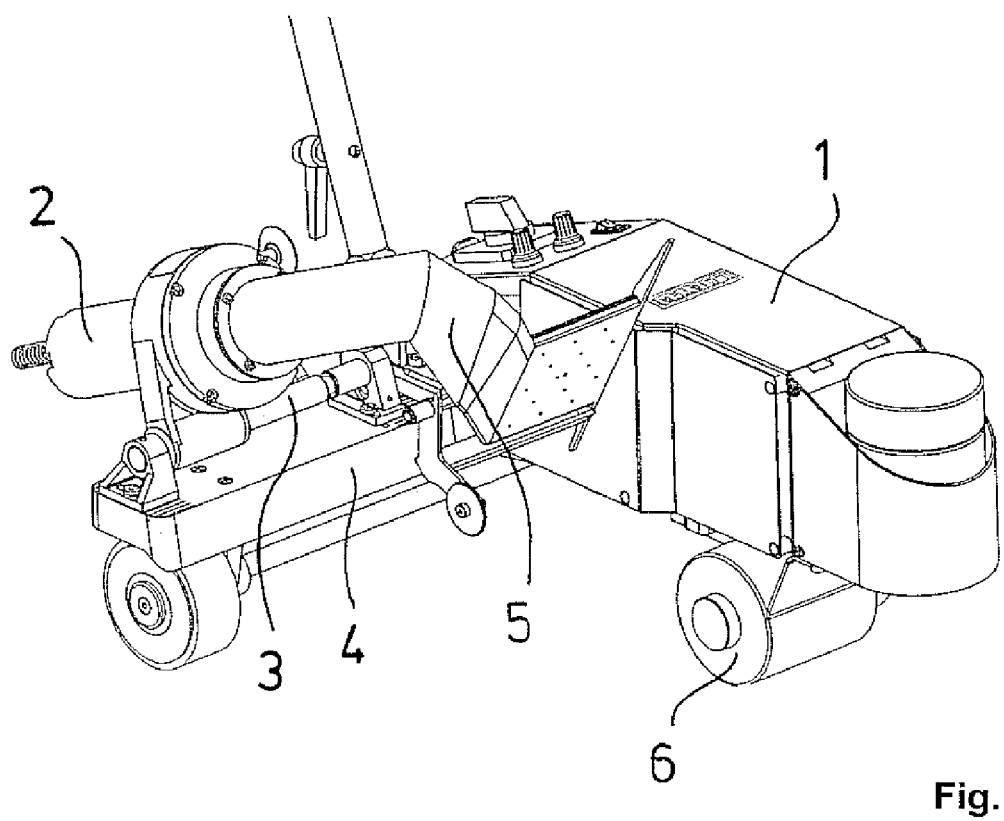
FIG. 2 shows the automatic hot air welding device according to FIG. 1 in rest position, with the hot air device tilted upward.

FIG. 2 shows the automatic hot air welding device 1 with the hot air device in rest position in which the hot air welding nozzle 5 is removed from the webs of sealing material by the rotation of the hot air device around the axis 3, and is rotated out of the area of the pressure roll 6. This process is generally known, and is common practice with automatic hot air welding devices of this type.

Figure 3:
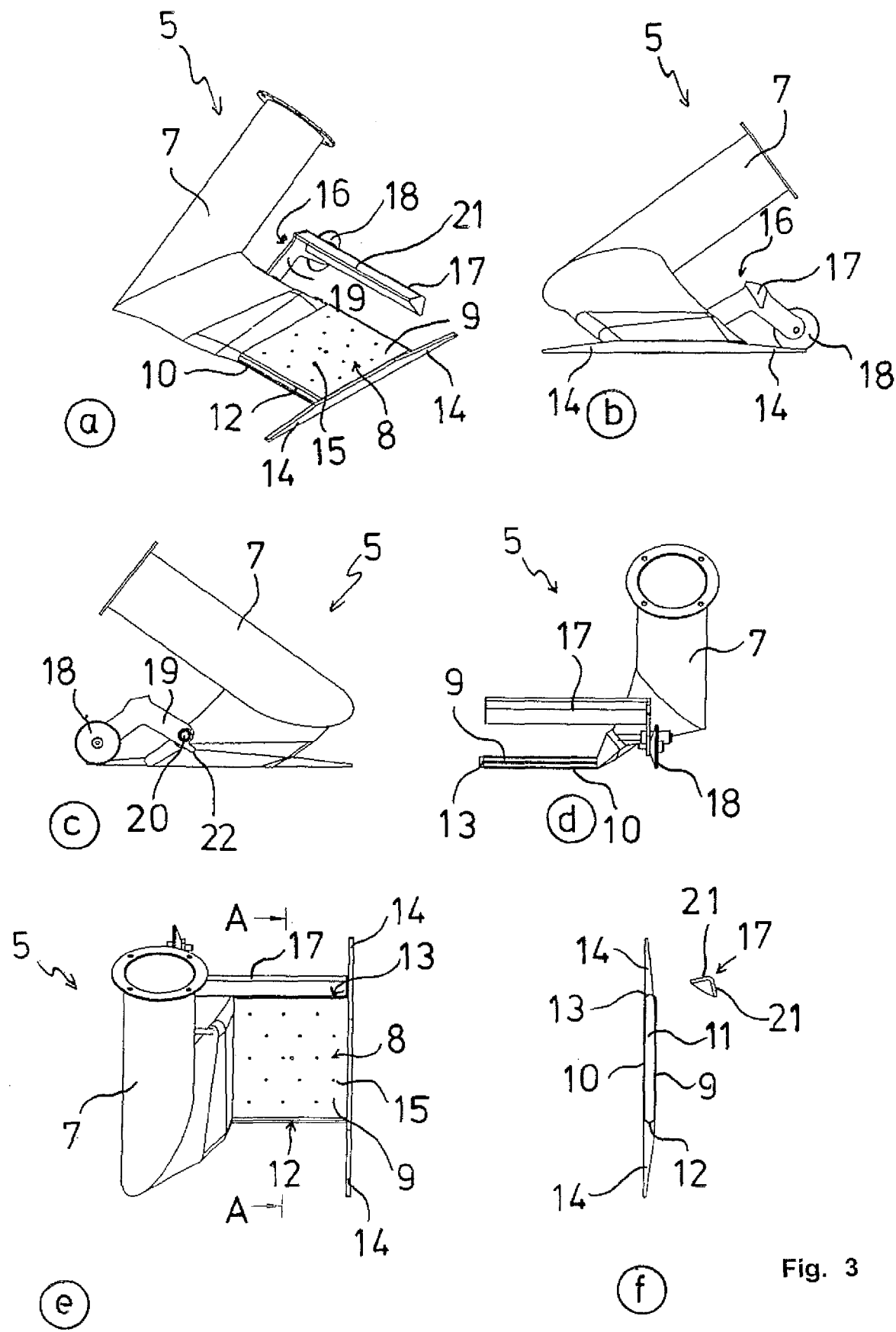
FIG. 3 shows various views of the hot air welding nozzle in operating position with a perspective view (FIG. 3a), a side view of the support of the air brake (FIG. 3c), a side view of the air guides (FIG. 3b), a rear view (FIG. 3d), a top view (FIG. 3e), and a section along line A-A of the air space and the air deflector (FIG. 3f)
Figure 4:
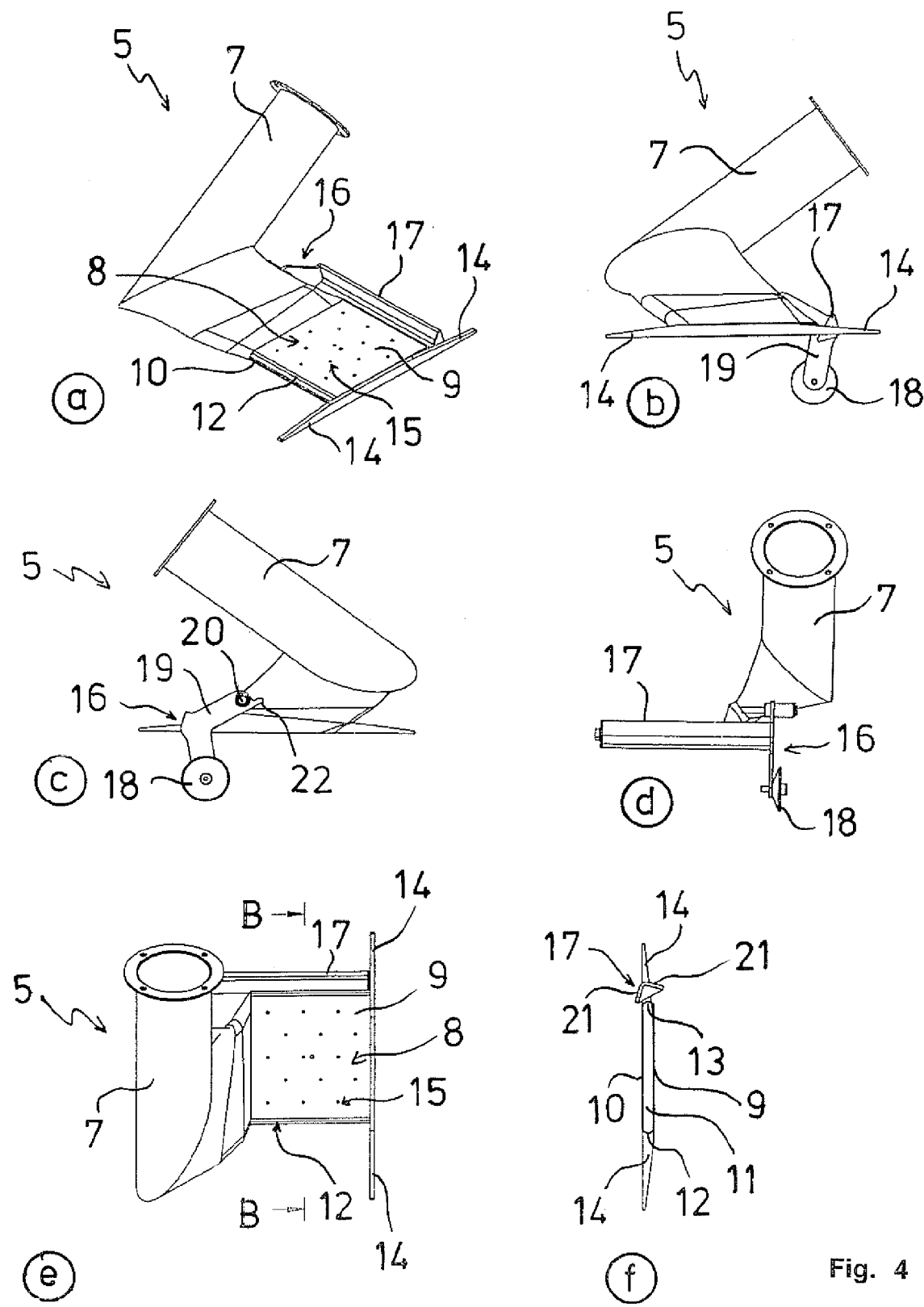
FIG. 4 shows various views of the hot air welding nozzle in rest position with a perspective view (FIG. 4a), a side view of the support of the air brake (FIG. 4c), a side view of the air guides (FIG. 4b), a rear view (FIG. 4d), a top view (FIG. 4e), and a section along line A-A of the air space and the air deflector (FIG. 4f).

FIGS. 3 and 4 show various views (FIGS. 3a-3f and 4a-4f, respectively) of the hot air welding nozzle 5 from FIGS. 1 and 2 in operating position (FIG. 3) and rest position (FIG. 4). The perspective view of FIGS. 3a and 4a shows the hot air supply 7 of the hot air welding nozzle 5 with the following top heat plate 9 with evenly distributed air outlets 15. Matching air outlets 15 are located on the bottom heat plate 10. The top heat plate 9 and the bottom heat plate 10 form an air space 11 (FIG. 3f), with the rear outlet 12 on one end and the front outlet 13 on the other. Laterally, one air guide 14 each is installed in the shape of metal guide strips that extend beyond the pre-heating zone 8 formed by the top heat plate 9 and the bottom heat plate 10 and the outlets 12, 13, preventing the hot air exiting from the outlets 12, 13 from reaching the other side of the air guides 14. At their ends, the top edges of the air guides 14 angle downward, thereby creating a gradual transition to the height of the heating zone 8 (FIG. 3b).

On the hot air welding nozzle 5, an air brake 16 is mounted that pivots around a horizontal shaft 20 and has a lever 19 carrying an air deflector 17 and a wheel 18. As FIGS. 3b and 3c show, the air deflector 17 is located in the area of the angle of the lever 19 and at a distance from the front outlet 13 when in operating position. The wheel 18 is at the level of the air guides 14, and therefore runs on the bottom web of sealing material (not shown). FIG. 3d and the sectional view in FIG. 3f show the spatial arrangement of the air deflector 17 in relation to the front outlet 13. The air deflector 17 consists essentially of a conical, elongated chute that is closed off at its front face and, in this embodiment, has longitudinal walls 21 that are perpendicular to each other. As the FIGS. 3a, 3d, and 3f show, the heat plates 9 and 10 are parallel.

FIG. 4 shows the same views as FIG. 3, with the hot air welding nozzle 5 along with the hot air device 4 in the rest position shown in FIG. 2. In this position, the air brake 16 is rotated downward against the stop 22 (FIG. 4c) so that the air deflector 17 is placed exactly in front of the front outlet 13, deflecting the exiting air back in the direction of the top and bottom heat plates 9 and 10 (FIG. 4f).

As explained above, the nozzle designed in accordance with the invention permits the welding of bitumen webs as well as of other webs of sealing material at a higher welding speed.

The invention claimed is:

1. A hot air welding nozzle for a hot air welding device for welding overlapping webs of sealing material comprising:
   a connection for a hot air supply,
   a top and a bottom heat plate forming an air space therebetween, and
   at least one rear outlet between the top and bottom heat plate on a facing side that is oriented in a direction opposite to a moving direction of the hot air welding device,
   wherein at least one front outlet relative to the moving direction of the hot air welding device is provided, and at least on an inner side, which faces away from the connection for the hot air supply, air guides are provided that extend beyond the facing side that is oriented in the direction opposite the moving direction and an opposite facing side that is oriented in the moving direction.

2. A hot air welding nozzle according to claim 1, wherein the at least one front outlet has an air outlet area that extends over the entire width of the heating zone formed by the top and the bottom heat plate.

3. A hot air welding nozzle according to claim 1, wherein the top and bottom heat plates are essentially parallel.

4. A hot air welding nozzle according to claim 1, wherein the top and bottom heat plates have air outlets.

5. A hot air welding nozzle according to claim 4, wherein the air outlets of the top and bottom heat plates are evenly distributed.

6. A hot air welding nozzle according to claim 1, wherein the air guides are designed as lateral metal guide strips that taper towards the free end.

7. A hot air welding nozzle according to claim 1, further comprising an air brake, that can be rotated into the hot air flow exiting from the nozzle of the hot air welding device when the nozzle is in rest position, installed in the area of the front outlet.

8. A hot air welding nozzle according to claim 7, wherein the air brake deflects the hot air exiting from the front outlet essentially in the direction of the top and bottom heat plates.

9. A hot air welding nozzle according to claim 8, wherein the air brake has a chute-type air deflection device that is formed by two longitudinal walls.

10. A hot air welding nozzle according to claim 7, wherein the air brake has a wheel that, when the hot air welding nozzle is placed on one of the webs of sealing material, rotates the air deflection device out of the flow of hot air, runs on the web of sealing material, and keeps the air deflection device out of the flow of hot air.

11. A hot air welding device for welding of overlapping webs of sealing material, in particular webs of sealing material made of bitumen, comprising a hot air welding nozzle as recited in claim 1, and a hot air device having an end to which the hot air welding nozzle is connected.

* * * * *